United States Patent
Govindarajan

(10) Patent No.: US 7,328,229 B2
(45) Date of Patent: Feb. 5, 2008

(54) CLOCK DIVIDER WITH GLITCH FREE DYNAMIC DIVIDE-BY CHANGE

(75) Inventor: Subash Chandar Govindarajan, Tamil Nadu (IN)

(73) Assignee: Texas Instruments Incorporated, Dallas, TX (US)

( * ) Notice: Subject to any disclaimer, the term of this patent is extended or adjusted under 35 U.S.C. 154(b) by 700 days.

(21) Appl. No.: 10/754,258

(22) Filed: Jan. 9, 2004

(65) Prior Publication Data

US 2004/0267848 A1 Dec. 30, 2004

Related U.S. Application Data

(60) Provisional application No. 60/439,271, filed on Jan. 10, 2003.

(51) Int. Cl.
*G06F 1/02* (2006.01)
(52) U.S. Cl. ............... 708/270; 708/103; 327/166; 327/291
(58) Field of Classification Search ........ 708/100–103, 708/250–277; 327/166, 291
See application file for complete search history.

(56) References Cited

U.S. PATENT DOCUMENTS 5,410,683 A * 4/1995 Al-Khairi ............... 713/501
5,524,035 A * 6/1996 Casal et al. ............... 377/47

* cited by examiner

*Primary Examiner*—Meng-Al T. An
*Assistant Examiner*—Michael Yaary
(74) *Attorney, Agent, or Firm*—Robert D. Marshall, Jr.; W. James Brady; Frederick J. Telecky, Jr.

(57) ABSTRACT

The circuit of this invention performs clock division with dynamic divide-by value change capability. This circuit provides low area and low latency. The clock divider is conventional except for the logic that handles the dynamic divide-by value change. When the divide-by value is changed by the user, such as through software, the changed value is recorded in a register but does not affect the divider immediately. Once the changed divide-by value is recorded, the divider clock output is allowed to continue till it reaches 'low' and is shut off. Then the recorded value is sent to the divider. The divider then generates a clock signal corresponding to the new divide-by value. The clock gating is then disabled and the clock propagates. This implements glitch free clock switching. This implementation of clock selection or switching provides low area and low latency for switching.

4 Claims, 3 Drawing Sheets

CLOCK DIVIDER WITH GLITCH FREE DYNAMIC DIVIDE-BY CHANGE

CLAIM OF PRIORITY

This application claims priority under 35 U.S.C. 119 (e)(1) from U.S. Provisional Application No. 60/439,271 filed Jan. 10, 2003.

TECHNICAL FIELD OF THE INVENTION

The technical field of this invention is clock control for electrical systems with glitch free clock divide-by changes.

BACKGROUND OF THE INVENTION

Clock division with dynamic divide-by value change capability is required in some applications. There is a need in the art to provide this capability while enabling glitch free clock selection when the divide-by value is changed.

SUMMARY OF THE INVENTION

The circuit of this invention performs clock division with dynamic divide-by value change capability. This circuit provides low area and low latency. The clock divider is conventional except for the logic that handles the dynamic divide-by value change. When the divide-by value is changed by the user, such as through software, the changed value is recorded in a register but does not affect the divider immediately. Once the changed divide-by value is recorded, the divider clock output is allowed to continue till it reaches 'low' and is shut off. Then the recorded value is sent to the divider. The divider then generates a clock signal corresponding to the new divide-by value. The clock gating is then disabled and the clock propagates. This implements glitch free clock switching. This implementation of clock selection or switching provides low area and low latency for switching.

BRIEF DESCRIPTION OF THE DRAWINGS

These and other aspects of this invention are illustrated in the drawings, in which.

DETAILED DESCRIPTION OF PREFERRED EMBODIMENTS

One way to implement dynamic divide-by clock switching employs a clock divider that always supplies a very low frequency clock. When a change in divide value is recorded, the circuit switches to the slower clock in a glitch free manner and then switches back to the primary divider once its output stabilizes.

This implementation requires the additional circuits of one more divider. When implemented in an integrated circuit, these additional circuits require additional area and increase manufacturing cost. This technique had a higher latency for switching due to the cross synchronization across two clock domains.

This application describes details of the clock divider circuit of an implementation of this Invention used in a clock control module (phase-locked loop wrapper). The clock divider circuit provides a programmable divide-by value from 1 to 32 at a 50% duty cycle for both even and odd divide-by values. The circuit supports glitch free clock switching for dynamic change in the divide-by value. The divide-by value is specified in a memory mapped register (MMR) that resides in VBUS clock domain. On reset, a default value specified by tie-offs at the boundary of PLL wrapper is be loaded into the memory mapped register dependent upon an external mode signal.

Figure 1:
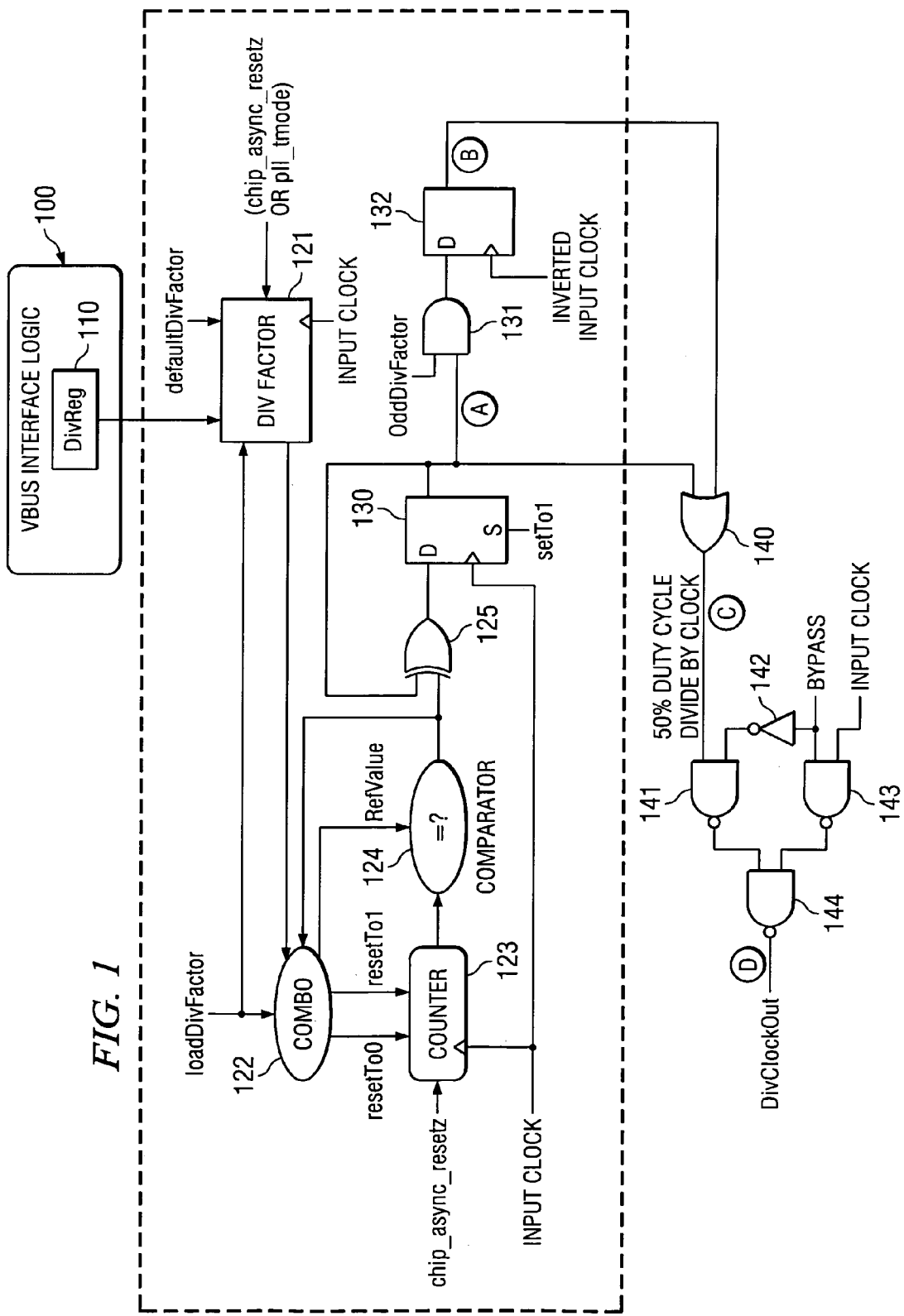
FIG. 1 illustrates the 50% duty cycle divide-by clock generation circuit of this invention.

FIG. 1 illustrates the details of the 50% duty cycle clock generation circuit. VBUS interface logic 100 includes memory mapped register (DivReg) 110 that stores the divide-by value. DivReg 110 may be written to via a conventional memory write to the memory mapped address of the register. According to this invention the divide-by value can be altered dynamically without causing a glitch in the clock output. DivReg 110 is in the VBUS clock domain. DivReg 110 is a 5 bit register coded as shown in Table 1.

TABLE 1

| Data | Divide-by Factor |
| --- | --- |
| 00000 | 1 |
| 00001 | 2 |
| 00010 | 3 |
| 00011 | 4 |
| 00100 | 5 |
| 00101 | 6 |
| 00110 | 7 |
| 00111 | 8 |
| 01000 | 9 |
| 01001 | 10 |
| 01010 | 11 |
| 01011 | 12 |
| 01100 | 13 |
| 01101 | 14 |
| 01110 | 15 |
| 01111 | 16 |
| 10000 | 17 |
| 10001 | 18 |
| 10010 | 19 |
| 10011 | 20 |
| 10100 | 21 |
| 10101 | 22 |
| 10110 | 23 |
| 10111 | 24 |
| 11000 | 25 |
| 11001 | 26 |
| 11010 | 27 |
| 11011 | 28 |
| 11100 | 29 |
| 11101 | 30 |
| 11110 | 31 |
| 11111 | 32 |

Div Factor register 121 is loaded with the default divide factor (defaultDivFactor) on chip reset (chip_async_resetz) or entry into the test mode (pll_tmode). The divide-by factor stored in DivReg 110 is loaded into div factor register 121 upon the loadDivFactor signal in synchronism with the input clock. The loadDivFactor signal also initializes combo circuit 122 including loading the divide-by factor from div factor register 121. Combo circuit 122 forms divideByValue from divFactor+1 and RefValue from a one bit right shift of divideByValue. This is the same as setting RefValue to int(divideByValue/2), the integer value of half of divideBy- Value. For example, if divfactor is 1, then divide-by equals 2 and RefValue equals 1. If divFactor is 2, then divide-by is 3 and RefValue=1. Counter 123 is set to 1 upon chip reset (chip_async_resetz). Counter 123 counts rising edges of the input clock. Comparator 124 compares the RefValue and the counter value. When the count of counter 123 matches RefValue, comparator 124 signals a match. This signal is one input to XOR gate 125. The other input to XOR gate 125 is the output of flip-flop 130. The output of XOR gate 125 drives the input of flip-flop 130. Thus a detected match toggles signal A (output of flip-flop 130). Comparator 124 also signals combo circuit 122. Combo circuit 122 resets counter 123 to 0 or to 1 via one of restTo0 or restTo1 on the following rising edge of the input clock. This operation of combo circuit 122 is described in the following pseudo code. Note the following definitions: A is the output of flip-flop 130, marked in FIG. 1; divideByValue is divFactor+1; RefValue is int (divideByValue/2); OddDivFactor indicates a odd divide-by value and is the inverse of divFactor[0], the inverse of the least significant bit of divFactor; shift_divfactor_out is divFactor[0], the least significant bit of divFactor; and posedge is the positive going edge of the input clock.

```
if (load_pll_config_reg) {-Test mode update
    resetTo1 = '1';
    resetTo0 = '0';
    nextDivFactor[4] = shift_divFactor_in;
                                -Shift input for test
    nextDivFactor]3:0] = divFactor [4:1];
                                -Right shift
}
else if (loadDivFactor) {       -loadDivFactor from clock
                                 switch block
    resetTo1 = '1';
    resetTo0 = '0';
    nextDivFactor = DivReg;
}
else if (counter == RefValue) {
    resetTo0 = OddDivFactor AND A;
    resetTo1 = not resetTo0;
}
else {
    resetTo0 = 0;
    resetTo1 = 0;
}
if (chip_async_resetz == 0) { -active low signal
    counter = 1;
}
else if (posedge (clock input)) {
    counter = 1 when resetTo1 = 1 else
    counter = 0 when resetTo0 = 1 else
    counter = counter + 1;
}
                                -divFactor Reg
if (chip_async_resetz or pll_mode == 0) {
    difFactor = defaultDivFactor;
}
else if ((posedge(clock input)) {
    divFactor = nextDivFactor;
}
```

The output of flip-flop 130 (signal A) supplies one input to AND gate 131 and one input to OR gate 140. AND gate 131 receives the OddDivFactor signal at its other input and supplies its output to the input to flip-flop 132. Flip-flop 132 is clocked by the inverse of the input clock. The output of flip-flop 132 (signal B) supplies the other input of OR gate 140. The output of OR gate 140 supplies one input of a multiplexer circuit including AND gates 141, 143 and 144 and inverter 142. When the bypass signal is non-active, the output from OR gate 140 passes through AND gates 141 and 144 to become the DivClockOut signal (signal D). When the bypass signal is active, the input clock passes through AND gates 143 and 144 to the DivClockOut signal.

Figure 2:
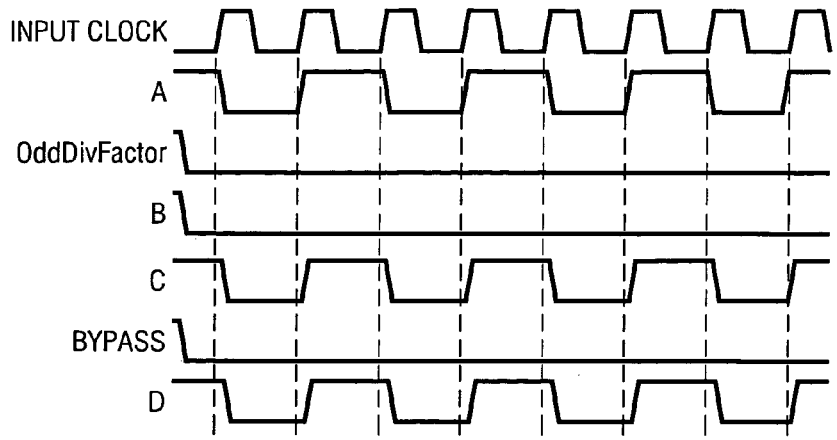
FIG. 2 illustrates typical waveforms for an even divide-by value.
Figure 3:
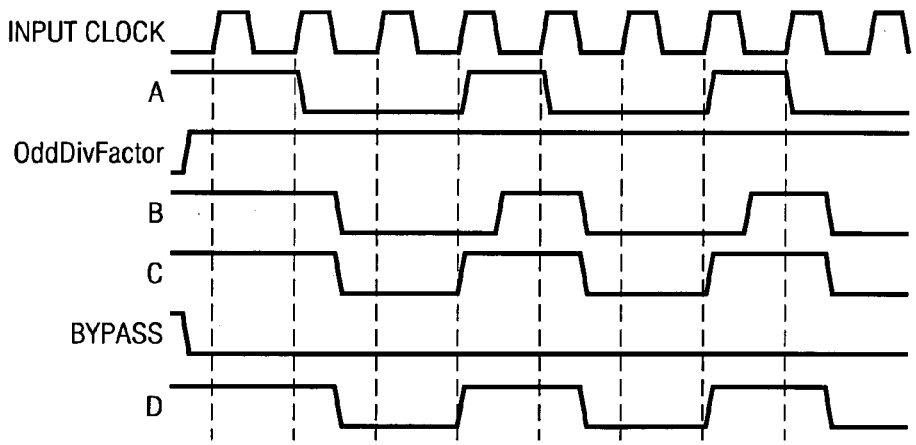
FIG. 3 illustrates typical waveforms for an odd divide-by value.

The difference in processing for even and odd divide factors is explained below in conjunction with signals illustrated in FIGS. 2 and 3. In FIGS. 2 and 3: signal A is the output of flip-flop 130; signal B is the output of flip-flop 132; signal C is the output of OR gate 140; and signal D is the DivClockOut from NAND gate 144, all illustrated in FIG. 1. FIG. 2 illustrates a divide-by value of 2 showing an even divide-by example. FIG. 3 illustrates a divide-by value of 3 showing an odd divide-by example.

FIG. 2 illustrates the Even divide-by example, which is the simplest. OddDivFactor is '0.' This supplies a '0' input to flip-flop 132 making signal B always '0.' OR gate 140 passes signal A to its output signal C. If bypass is '0' (inactive), then the DivClockOut signal D is also the same as signal A. Since OddDivFactor is '0,' resetTo0 is '0,' resetTo1 is '1' and thus counter 123 is always reset to '1.'

FIG. 3 illustrates the Odd divide-by example. As listed in the pseudo code above, if the current state of signal A is '1' and OddDivFactor is '1' indicating the divide-by value is odd, then combo circuit 122 will generate resetTo1 equal to '0' and resetTo0 equal to '1' when comparator 124 generates a match signal. This will reset counter 123 to '0.' The opposite occurs if signal A is '0' and OddDivFactor is '1.' For ODD divide-by values, signal A will be '0' for (divide-ByValue+1)/2 cycles and will be '1' for {(divideByValue−1)/2 cycles. This is illustrated in FIG. 3, where signal A is '1' for one cycle ((3−1)/2) and '0' for two cycles ((3+1)/2). With OddDivFactor equal to '1,' signal A is supplied to the input of flip-flop 132. Flip-flop 132 is clocked by the inverse of the input clock. This forms signal B delayed relative to signal A by half a cycle (see FIG. 3). OR gate 140 receives signals A and B and forms 50% duty cycle signal C for odd divide-by values.

Figure 4:
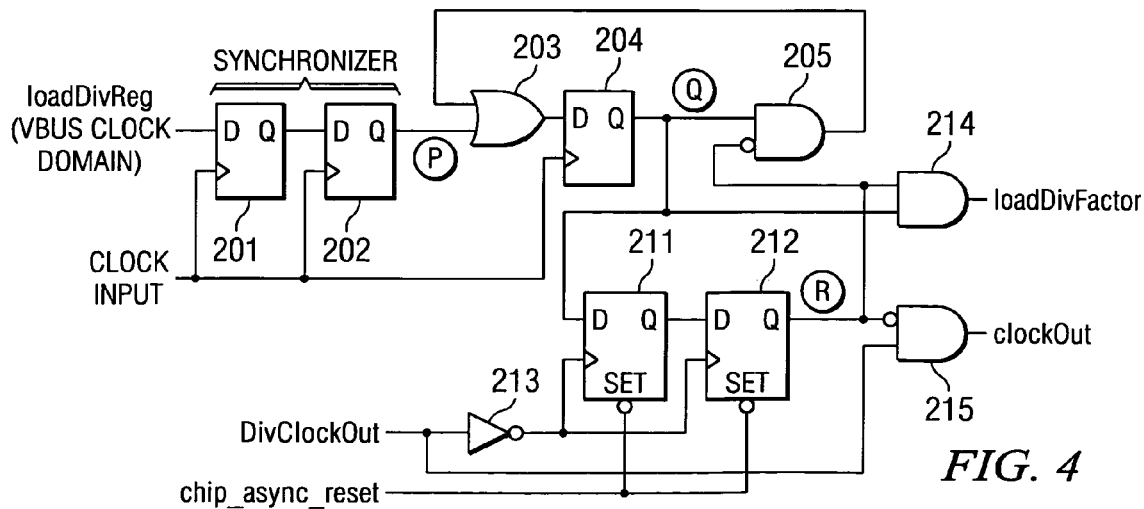
FIG. 4 illustrates the clock switch circuit of this invention.

FIG. 4 illustrates the circuit that enables glitch free clock switching for dynamic change in the divide-by value. A VBUS clock domain signal loadDivReg indicates that a new divide-by value is to be loaded into DivReg 110. This signal loadDivReg is synchronized to the input clock via serially connected flip-flops 201 and 202 which are clocked by the input clock forming signal P. Signal P is input to one input of OR gate 203 then applied to the input of sticky flip-flop 204. Ignoring for the moment its inverting input, AND gate 205 feeds back the output of sticky flip-flop 204 to the other input of OR gate 203.

Figure 5:
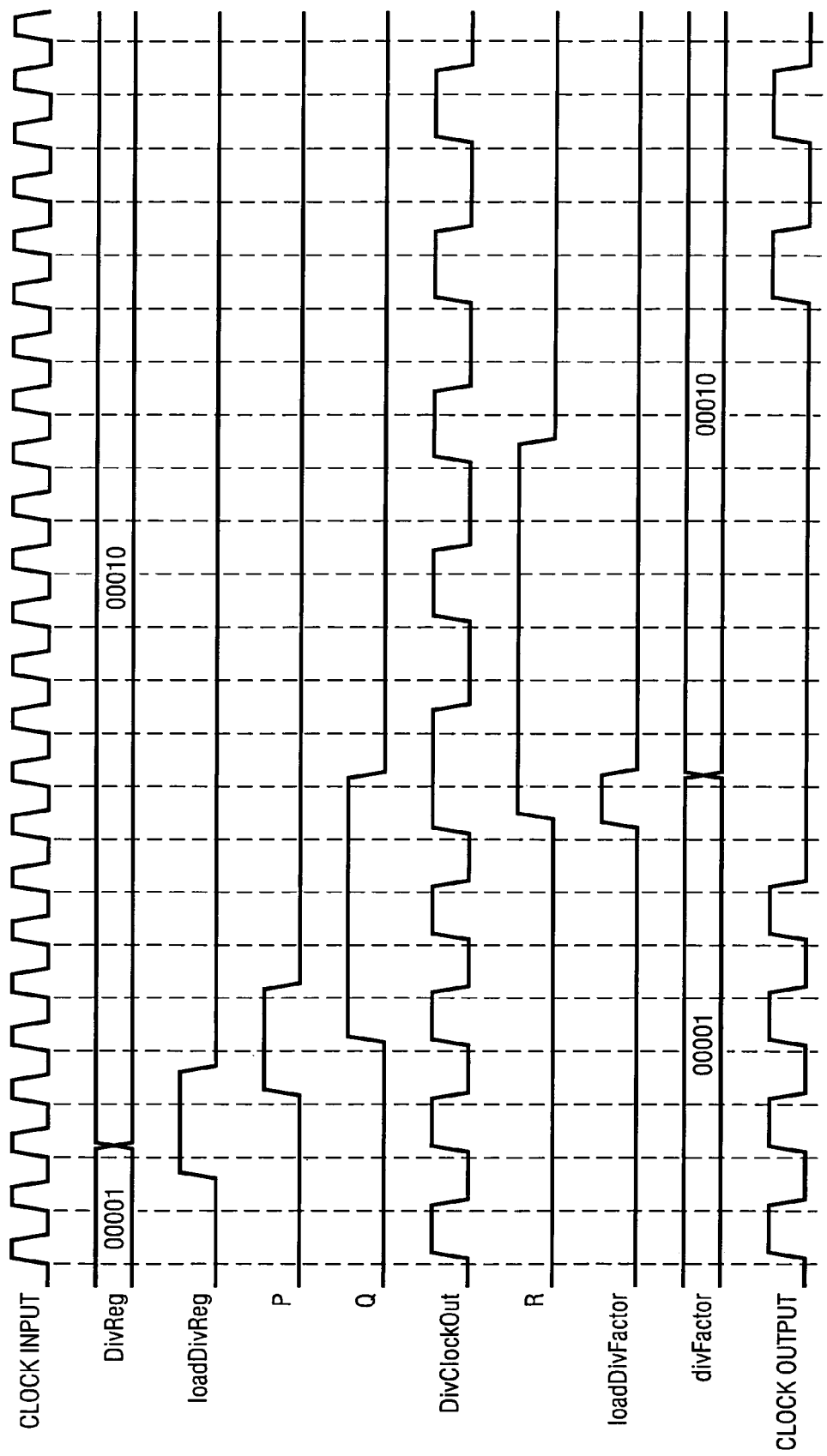
FIG. 5 illustrates typical waveforms using the dynamic divide-by clock switch circuit of FIG. 4.

As illustrated in FIG. 5, the loadDivReg signal becomes inactive soon after the VBUS register write request is processed by the VBUS interface logic. However, the feedback from sticky flip-flop 204 via AND gate 205 and OR gate 203 causes signal Q to be sticky and remain set. This sticky bit (signal Q) is then synchronized to current divide-by clock via serially connected flip-flops 211 and 212. Flip-flops 211 and 212 are clocked by the inverse of the current DivClockOut signal D (see FIG. 1) via inverter 213. Flip-flops 211 and 212 are reset by the chip_async_resetz signal. The rising edge of Signal R is thus delayed from signal Q by two falling edges of the current DivClockOut signal D.

Signal R is supplied to the inverting input of AND gate 205, an input of AND gate 214 and an inverting input of AND gate 215. When signal R is '1' it blocks the feedback of signal Q via the inverting input of AND gate 205. Signal Q returns to '0' on the next rising edge of the input clock because the '0' at loadDivReg signal causes signal P to be '0.' When signal R is '1' the inverting input of AND gate 215 holds the current divide-by clock at 'low' level. When signal R is '1', the loadDivFactor output of AND gate 214 goes active for one clock period of the input clock. This causes the DivFactor register 121 to load the new data into DivReg register 110. This also clears counter 123 and flip-flop 130. Signal A in FIG. 1 becomes '0.' The divider circuit of FIG. 1 produces the DivClockOut signal corresponding to the updated divide-by value. After two rising edges of the divide-by clock, signal R returns to '0.' At this point clockOut follows DivClockOut signal D via AND gate 215.

FIG. 5 illustrates example waveforms at different points in FIG. 4 upon a divide-by value change. The example of FIG. 5 illustrates when the divide-by value is changed from 2 to 3. In FIG. 5 the DivReg register 110 changes from 00001 to 00010. According to Table 1 a DivReg register 110 value of 00001 corresponds to a divide-by of 2 and DivReg register 110 value of 00010 corresponds to a divide-by of 3. As shown in FIG. 5, any possible glitch upon divide-by switch is prevented by delaying implementation of the change in divide-by factor and postponing switching the new clock to the clocked system until after a delay following the divide-by switch. The circuit of FIG. 4 implements a delay of two cycles of the new divided clock, but longer delays are feasible.

What is claimed is:

1. A programmable divide-by clock generator comprising:
   a writeable register storing a divide-by factor;
   a divide factor register having a data input connected to said writeable register and an enable input receiving a load divide factor signal for storing said divide-by factor stored in said writeable register upon receipt of a load divide factor signal;
   a counter receiving and counting an input clock a number of cycles corresponding to said divide-by factor stored in said divide factor register thereby generating a divided clock signal;
   a first synchronizer having an input receiving a load divide register signal upon writing to said writeable register and a clock input receiving said input clock for delaying said load divide register signal to synchronize with said input clock at an output;
   an OR gate having a first input connected to said output of said first synchronizer, a second input and an output;
   a flip-flop having a data input connected to said output of said OR gate, a clock input receiving said input clock and an output, said flip-flop storing and outputting a signal received at said data input upon each receipt of a clock signal at said clock input;
   a first AND gate having a first input connected to said output of said flip-flop, a second inverting input and an output connected to said second input of said OR gate;
   a second synchronizer having an input connected to said output of said flip-flop and a clock input receiving said divided clock signal for delaying said output of said flip-flop to synchronize with an inverse of said divided clock signal at an output, said output connected to said second inverting input of said first AND gate;
   a second AND gate having a first input connected to said output of said flip-flop, a second input connected to said output of said second synchronizer and an output connected to said load enable input of said divide factor register generating said load divide factor signal; and
   a third AND gate having a first input receiving said divided clock signal of said counter, a second inverting input connected to said output of said second synchronizer and an output generating a divided clock output signal, said divided clock output signal corresponding to said input clock divided by said divide-by factor.

2. The programmable divide-by clock generator of claim 1, wherein:
   said writeable register is a memory mapped data register and writing to said writeable register consists of writing data to a memory mapped address corresponding to said writeable register.

3. The programmable divide-by clock generator of claim 1, wherein:
   said first synchronizer includes
   a first flip-flop having a data input receiving said load divide register signal, a clock input receiving said input clock and an output, said first flip-flop storing and outputting a signal received at said data input upon each receipt of a clock signal at said clock input, and
   a second flip-flop having a data input connected to said output of said first flip-flop, a clock input receiving said input clock and an output forming said first synchronizer output, said second flip-flop storing and outputting a signal received at said data input upon each receipt of a clock signal at said clock input.

4. The programmable divide-by clock generator of claim 1, wherein:
   said second synchronizer includes
   an inverter having an input connected to said counter receiving said divided clock signal and an output,
   a first flip-flop having a data input receiving said output of said flip-flop, a clock input connected to said output of said inverter and an output, said first flip-flop storing and outputting a signal received at said data input upon each receipt of a clock signal at said clock input; and
   a second flip-flop having a data input connected to said output of said first flip-flop, a clock input connected to said output of said inverter and an output forming said first synchronizer output, said second flip-flop storing and outputting a signal received at said data input upon each receipt of a clock signal at said clock input.

* * * * *